July 16, 1963 H. B. RICE ETAL 3,097,554
FLUID DRIVEN MECHANISM
Original Filed March 31, 1958 2 Sheets-Sheet 1
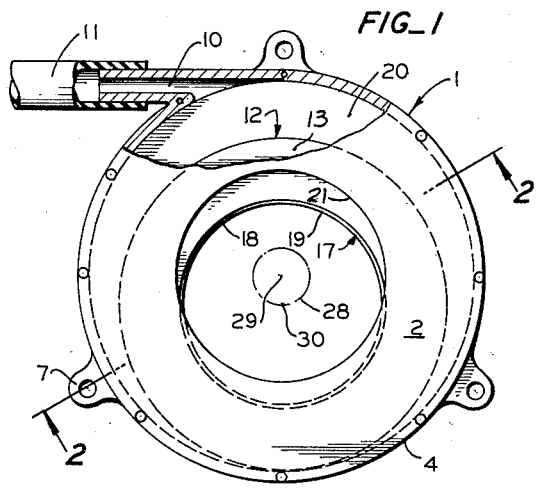
FIG_1
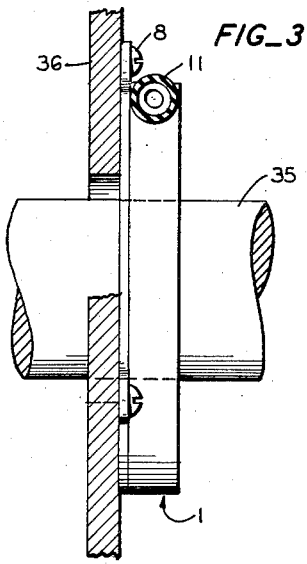
FIG_3
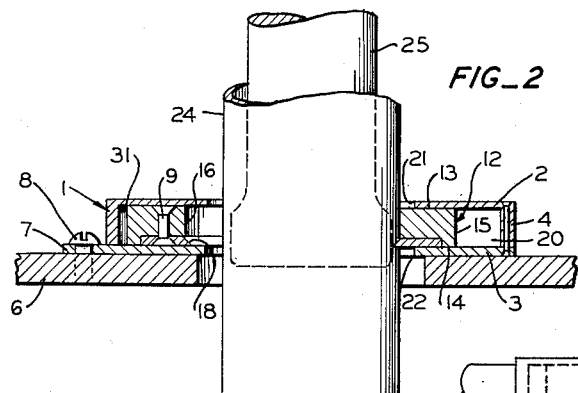
FIG_2
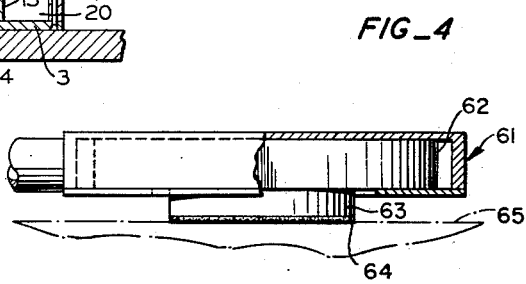
FIG_4
INVENTORS
JOHN G. AGUILAR
HAROLD B. RICE
BY
Bayken, Hohler & Wood.
ATTORNEYS July 16, 1963 H. B. RICE ETAL 3,097,554
FLUID DRIVEN MECHANISM
Original Filed March 31, 1958 2 Sheets-Sheet 2
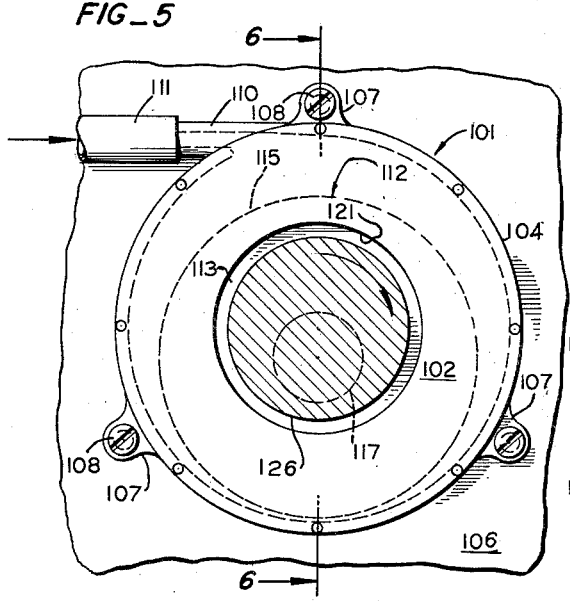
FIG_5
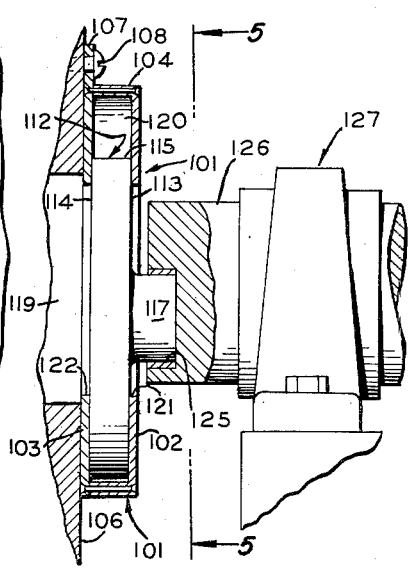
FIG_6
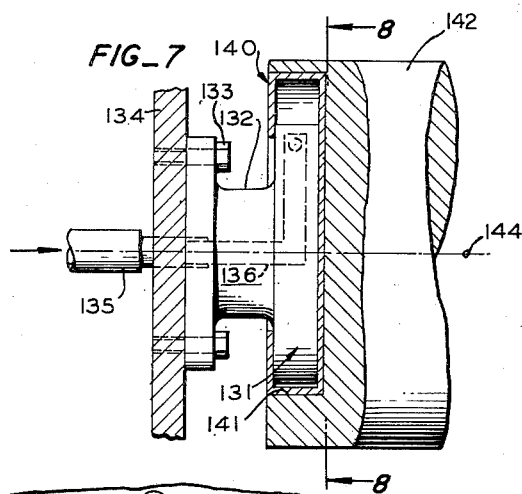
FIG_7
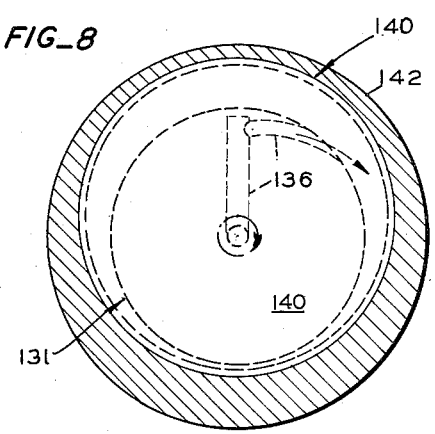
FIG_8
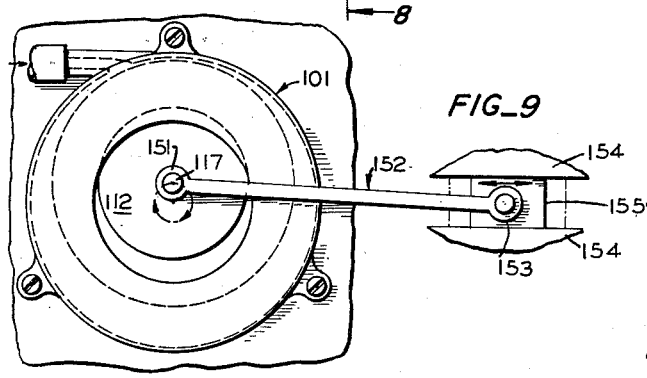
FIG_9
INVENTORS
JOHN G. AGUILAR
HAROLD B. RICE
BY
Boyken, Mohler & Wood
ATTORNEYS

United States Patent Office 3,097,554
Patented July 16, 1963

3,097,554
FLUID DRIVEN MECHANISM
Harold B. Rice, Contra Costa County, Calif., and John G. Aguilar, deceased, late of Contra Costa County, Calif., by Clotiel Aguilar, administratrix, Contra Costa County, Calif., assignors to John Burton Machinery Corporation, Concord, Calif.
Continuation of applications Ser. No. 725,312 and Ser. No. 725,416, Mar. 31, 1958. This application Jan. 18, 1960, Ser. No. 3,205
12 Claims. (Cl. 82—59)

This invention relates to a fluid driven mechanism that lends itself to use as a tool or a motor and which has certain advantages over prior art mechanisms of like nature.

This application is a continuation of copending applications Serial Nos. 725,312 and 725,416 filed on March 31, 1958 and now abandoned.

One of the objects of the invention is the provision of a fluid driven mechanism which lends itself to use as an improved tool having greater flexibility, by virtue of its fluid drive, than has heretofore been possible.

Another object of the invention is the provision of a fluid driven mechanism which lends itself to use as a tool in which the work engaging element is adapted to work on a circular workpiece, either internally or externally, so that exact positioning of the work relative to the tool is not required.

Yet another object of the invention is the provision of a fluid driven mechanism which lends itself to use as a tool having a self-centering feature permitting the tool to work on a circular workpiece without requiring rotatable support of the work engaging member.

Still another object of the invention is the provision of a fluid driven mechanism which lends itself to use as an extremely simple motor that is inexpensive to build and that lends itself to operation with an inexpensive motive medium such as air under pressure.

Other objects and advantages will be apparent from the specification and from the drawings.

FIG. 1 is a top plan view of one form of the invention in which the mechanism is incorporated in a tool in a horizontal position and is provided with an annular cutter for cutting a vertically extending length of tubular material.

FIG. 2 is a horizontal cross section through the mechanism of FIG. 1 showing the work in elevation.

FIG. 3 is a vertical side elevation showing the mechanism of FIG. 1 used in a vertical position for working on a horizontally extending workpiece.

FIG. 4 is a side elevation partly in section of another form of the invention adapted for use as a sander or the like.

FIG. 5 is a vertical front elevation of the mechanism adapted for use as a motor with the driven shaft to which it is connected shown in section.

FIG. 6 is a vertical sectional view of the device of FIG. 5 as taken along lines 6—6 of FIG. 5 with portions of the associated driven shaft shown in elevation.

FIG. 7 is a vertical sectional view of a modified form of the invention in which the outer member is movable.

FIG. 8 is a vertical cross section through the driven shaft of FIG. 7 as taken along lines 8—8 of FIG. 7.

FIG. 9 is a front elevation of the invention adapted for use as a motor showing another method of connecting the motor and a driven element.

Description of Tool

In detail, and with reference to FIGS. 1, 2, the form of the invention when used as a cutting tool comprises a casing, generally designated 1, having a pair of opposed parallel faceplates 2, 3, and a peripherally extending outer circular sidewall 4. Casing 1 is shown disposed horizontally in FIGS. 1, 2, and may be fixedly secured to a suitable support 6 (FIG. 2) by means of lugs 7 and screws 8.

The circular side 4 is formed to provide an inlet 10 for fluid, such as air, water or oil, and to which a hose 11 may be secured for connecting the casing with any suitable source (not shown) of fluid under pressure.

Mounted within casing 1 is a movable member 12, which is shown as annular in FIGS. 1, 2, having a pair of opposite parallel sides 13, 14, a radially outwardly directed peripheral side 15 and a radially inwardly directed inner circular side 16. Secured by fasteners 9 to the one side of member 12 that is adjacent faceplate 3 of the casing is an annular cutter generally designated 17 which is formed with an upwardly directed bevel 18 to provide a cutting edge 19.

The outer diameter of member 12 is substantially less than the inner diameter of circular side 4 of the casing 1 thereby providing a circular passageway 20 between said member and circular side 4. Said passageway 20 is of substantially uniform cross sectional extent when member 12 is coaxial with the casing 1.

A slight clearance must exist between the member 12 (which includes the cutter 17) and the adjacent sides 2, 3, of the casing 1 so that air may escape in a radially inward direction from the passageway 20 that is outwardly of member 12.

The side plates 2, 3, are provided with relatively large central openings 21, 22, respectively, somewhat larger than the diameter of the cutting edge 19 of cutter 17, so that a workpiece such as indicated at 24 may be received within the cutting edge 19. The member 12 is shown non-concentric with the casing 1 in FIG. 2 in which case the cutting edge 19 is in engagement with the work 24. When the device is used as a cutter on relatively flexible material an internal mandrel 25 may be employed to back up the work 24 against the urging of cutter 17.

In operation, when air or other fluid is introduced under pressure through inlet 10 the inner movable member 12 is urged at a relatively high rate of speed in a clockwise direction (FIG. 1) around the inner periphery of the casing 1 so that the central axis of said member moves along a circular path of travel indicated by dot-dash line 28 in FIG. 1. The member 12 also undergoes a rolling action along the inner periphery of casing 1. However, it will be understood that if resistance to such rolling is present, the action of the member 12 in revolving about the central axis 29 (FIG. 1) is unchanged. In this connection the movement of the member 12 will be referred to herein as "revolution" inasmuch as the central axis 30 of member 12 revolves about the central axis 29 of casing 1. Such "revolution" exists whether or not the member 12 "rotates" about its own axis 30, which it does when the outer periphery of member 20 rolls on the inner periphery of the casing.

The embodiment of FIGS. 1, 2, is adapted to be employed to cut the tubular material constituting the workpiece 24. In this connection it should be noted that the edge 19 of cutter 12 progressively cuts the work and if the cutter member 12 also undergoes rotation as well as revolution such cutting action is not affected but is actually enhanced because an additional shearing action results.

When the device of FIG. 1 is actually set up to engage a centrally positioned workpiece, the proportions of mandrel 25, the casing 1, and the member 12, should be such that a slight clearance, indicated at 31 in FIG. 2, exists between member 12 and the circular side of casing 1. This, of course, insures that the cutter engages the work at all points along the periphery of the latter. Since, in such a case, no rolling action between member 12 and casing 1 exists, the member 12 may undergo pure revolution. However, in the event rotation of member 12 results because of the resistance of the work, this in itself does not adversely affect the cutting action, and in fact, improves it.

It should be noted from FIGS. 1, 2, that the passageway 20 that exists between the outer periphery 15 of member 12 and the inner periphery of circular side 4 is of uniform cross sectional extent when member 12 is concentric with casing 1. If the device of FIG. 1 is run without any load thereon said passageway 32 is not continuous but is interrupted only by the movable member 12 itself. On the other hand when the device is in operation and in engagement with a workpiece the passageway 20 is continuous and unobstructed but is reduced in cross sectional extent at one point to the clearance required to prevent engagement between the outer periphery 15 of member 12 and the inner periphery of casing 1. However, the driving effect of the fluid in causing the member 12 to revolve is not affected by the clearance 31 (FIG. 2) and results in only a negligible loss of power.

At this point it can be pointed out that the member "floats" within casing 1, not only because vanes and the like are not employed, but also because the member is yieldably urged into engagement with the work by fluid pressure and not by a direct rigid connection. Furthermore, the only means of escape for the fluid is between member 12 and the opposed face plates 2, 3. This results in the member 12 being completely surrounded by fluid and therefore free of frictional resistance to its movement except for that offered by the work.

The absence of vanes of course makes the above described device extremely simple in operation, rugged insofar as wear is concerned, and economical to operate.

It will also be apparent that the operation of the tool will be unaffected if the work is not centered exactly on the axis of casing 1. In other words it is not required to take great precautions in setting up the work.

As illustrated in FIG. 3 the device may also be employed in a vertical position for use with a horizontally extending workpiece 35 in which case the tool may be secured to support 36 that is disposed vertically.

It will be apparent that the tool is not restricted to a cutting operation but may be employed for various operations such as polishing, buffing, grinding and the like.

Another form of the invention is shown in FIG. 7 wherein a casing 61, similar to casing 1 of FIG. 1 is provided and an inner movable member 62. In this case the inner member is provided with an axially outwardly extending boss 63 to which is secured a flat abrasive material 64 adapted to engage a flat surface to be finished such as that indicated by dot-dash line 65.

Description of Motor

As in the case of the tool, the motor comprises a casing, generally designated 101, having a pair of opposed parallel face-plates 102, 103, and a peripherally extending outer circular side wall 104. Casing 101 may be fixedly secured to a suitable support 106 by means of lugs 107 and screws 108.

The circular side 104 is formed to provide an inlet 110 for fluid such as air, water or oil, and to which hose 111 may be secured for connecting the casing with any suitable source (not shown) of fluid under pressure.

Mounted within casing 101 is a movable member 112 having a pair of opposite parallel sides 113, 114, and a radially outwardly directed peripheral side 115. The member 112 is not apertured as in the case of the tool and extending axially outwardly from side 113 of member 112 through a circular opening 121 in side 102 of casing 101 is a short shaft 117 which may be formed integral with member 112.

The outer diameter of member 112 is substantially less than the inner diameter of circular passageway 120 between said member and circular side 104. Said passageway 120 is of substantially uniform cross sectional extent when said member 112 is coaxial with the casing 101.

As in the case of the tool, a slight clearance must exist between the sides 113, 114 of member 112 and sides 102, 103 of casing 101 so that air may escape in a radially inward direction from the passageway 120 that is outwardly of member 112. Also a circular opening 122 similar to opening 121 may also be provided in side 103 of casing 101 to permit escape of air between side 114 of member 112 and side 103 of casing 101 in which case the support 106 may be formed with a central opening 119 to permit escape of such discharged air to the atmosphere.

The axial extension or shaft 117 of member 112 may be received within a complementarily formed opening 125 in a shaft 126 supported in suitable bearings such as bearing 127. Shaft 126 may be coaxial with the casing 101 but opening 125 is eccentric in the same manner as member 112 is eccentric to casing 101.

In operation, when air or other fluid is introduced under pressure through inlet 110 the inner movable member 112 is urged to revolve around the central axis of the casing 101 in a clockwise direction (FIG. 5) drawing with it the shaft 126. It will be apparent that the interconnection between member 112 and shaft 126 is such that member 112 may rotate about its own axis. However, the motion which drives shaft 126 is the revolution of member 112 about the common axis of casing 101 and shaft 126. At this point it is emphasized that the work done in driving shaft 126 is due to the "revolution" of member 112 along a circular path of travel concentric with the common axis of casing 101 and shaft 126. If the member 112 undergoes "rotation" about its own axis such movement is incidental and does not transmit torque although such rotation does not affect the operation of the motor. In other words it is the orbital movement of member 112 that drives shaft 126.

It will be apparent that the same object may be achieved by arranging the parts in a reversed manner. Referring to the modified form shown in FIGS. 7, 8, the inner member generally designated 131 is provided with an axial extension 132 that may be secured by bolts 133 to a support 134. Air or other fluid is supplied from conduit 135 through a passageway 136 in extension 132 and thence radially through member 131 and is discharged generally tangentially outwardly. Casing 140 is received within a complementarily formed recess 141 in a rotatably supported driven shaft 142. It will be apparent upon introduction of fluid under pressure into the passageway between member 131 and casing 140 that the latter will revolve around the central axis 144 of inner member 131 and shaft 142 driving said shaft with it. The same results is therefore achieved as by the structure of FIGS. 5, 6 although the latter structure is preferred.

If it is desired to obtain a reciprocating motion a structure such as shown in FIG. 9 may be employed. In this case the same device as shown in FIG. 5 may be employed except that the axial extension 117 of the inner member 112 may be rotatably received within one end 151 of a connecting rod 152 which may be rotatably connected at its other end 153 to the driven element 155 slidably received within guides 154.

The above described motor is particularly adapted to the efficient development of power since the movable member 112 literally floats in the driving fluid and there is no sliding engagement between the parts to produce friction. Furthermore, such efficiency is also promoted by the absence of sliding vanes and the like such as are employed in fluid pumps. The power transmitted is readily adjusted by merely adjusting the pressure and volume of the driving fluid.

It will be understood from considering FIGS. 6, 8, that the various parts should be proportioned so that only a very slight clearance in a radial direction exists between the stationary member and the fixed member so as to permit the fluid to act over as large an effective area as possible. Obviously, such clearance cannot be reduced to such an extent that the members engage each other as this might cause jamming of the parts because the axis of the driven shaft is fixed.

Regardless of which form of the motor is employed it will be obvious that the same may be disposed vertically with a horizontally driven shaft or may be disposed horizontally for driving a vertically extending shaft, or may take any intermediate position.

The above very specific descriptions of various forms of the invention are not to be taken as restrictive of the invention as it is apparent that various modifications will occur to those skilled in the art without departing from the spirit of the invention or the scope thereof as defined in the following claims.

We claim:

1. A fluid driven mechanism comprising: a pair of inner and outer members having parallel central axes, said inner member having planar parallel opposite sides with one of said member floatingly mounted relative to the other for free movement in a plane at right angles to said axes, the inner periphery of said outer member and the outer periphery of said inner member being concentric and radially spaced apart when said members are coaxial to provide a circular unobstructed passageway, means for directing fluid under pressure along the length of said passageway for revolving said one member about the axis of the other, said outer member being provided with opposed annular flanges respectively closely adjacent the opposite sides of said inner member to permit fluid to escape from said passageway through the spaces between said inner member and said flanges for so floatingly mounting said members.

2. A fluid driven tool comprising: a pair of inner and outer members having parallel central axes with one of said members floatingly mounted relative to the other for free movement in a plane at right angles to said axes, the inner periphery of said outer member and the outer periphery of said inner member being radially spaced apart when said members are coaxial to provide a peripherally extending unobstructed passageway, means for directing fluid under pressure along the length of said passageway for revolving said one member relative to the axis of the other, and a work engaging element carried by said one member for engaging a workpiece.

3. A fluid driven tool comprising: a pair of inner and outer members having parallel central axes with one of said members floatingly mounted relative to the other for free movement in a plane at right angles to said axes, the inner periphery of said outer member and the outer periphery of said inner member being concentric and radially spaced apart when said members are coaxial to provide a circular unobstructed passageway, means for directing fluid under pressure along the length of said passageway for revolving said one member about the axis of the other, and a work engaging element carried by said one member for engaging a workpiece, said outer member being provided with opposed annular flanges axially spaced apart a distance slightly greater than the axial width of said inner member to provide clearances between said inner member and said flanges through which fluid from said passageway escapes for so floatingly mounting said members.

4. A fluid driven tool comprising: a fixed casing having a substantially circular radially inwardly directed side, a member floatingly mounted within said casing and free for movement in a plane at right angles to the axis of said side, the outer periphery of said member being radially inwardly spaced from said inner side of said casing when said member and said side are coaxial to provide a circular unobstructed passageway, means for directing fluid under pressure along the length of said passageway for revolving said member about said axis, and a work engaging element carried by said member for engaging a workpiece.

5. A fluid driven tool comprising: a fixed casing having a substantially circular radially inwardly directed side, a member floatingly mounted within said casing and free for movement in a plane at right angles to the axis of said side, the outer periphery of said member being radially inwardly spaced from said inner side of said casing when said member and said side are coaxial to provide a circular unobstructed passageway, means for directing fluid under pressure along the length of said passageway for revolving said member about said axis, said member and said casing being formed to provide a central opening adapted to receive a workpiece therein, and a work engaging element carried by said member for engaging said workpiece.

6. A fluid driven tool comprising: a fixed casing having a substantially circular radially inwardly directed side, a member floatingly mounted within said casing and free for movement in a plane at right angles to the axis of said side, the outer periphery of said member being radially inwardly spaced from said inner side of said casing when said member and said side are coaxial to provide a circular unobstructed passageway, means for directing fluid under pressure along the length of said passageway for revolving said member about said axis, and a work engaging element carried by said member for engaging a workpiece, said casing being formed to provide a pair of opposed annular flanges extending radially inwardly of said side and closely adjacent the opposite sides of said member to provide clearances between said opposite sides and said flanges for so floatingly mounting said member.

7. A fluid driven tool comprising: a fixed casing having a substantially circular radially inwardly directed side and a pair of parallel opposed faceplates secured to said side, a member received within said casing and formed with its opposite sides parallel to and closely adjacent the inner sides of said faceplates for floatingly mounting said members relative to said casing for movement in a plane perpendicular to the axes of said casing, said casing and said member being formed with central openings to permit an elongated workpiece to be received therethrough substantially coaxial with said casing, means for directing fluid under pressure tangentially between said member and said circular side of the casing and between said opposite sides of said member and said faceplates for imparting a revolvable movement to said member and for so floatingly mounting said member, and a work engaging element carried by said member at the central opening thereof for engaging said workpiece.

8. A fluid driven motor comprising: a pair of inner and outer members having parallel central axes with one of said members floatingly mounted relative to the other for free movement in a plane at right angles to said axes, the inner periphery of said outer member and the outer periphery of said inner member being radially spaced apart when said members are coaxial to provide a peripherally extending unobstructed passageway, means for directing fluid under pressure along the length of said passageway for revolving said one member relative to the axis of the other, and means for connecting said inner member to a driven element for imparting motion to the latter.

9. A fluid driven motor comprising: a fixed casing having a substantially circular radially inwardly directed side, a member floatingly mounted within said casing and free for movement in a plane at right angles to the axis of said side, the outer periphery of said member being radially inwardly spaced from the inner side of said casing when said member and said side are coaxial to provide a circular unobstructed passageway, means for directing fluid under pressure along the length of said passageway for revolving said member about said axis and means for connecting said member to a driven element for imparting rotary movement to the latter.

10. A fluid driven motor comprising: a fixed casing having a substantially circular radially inwardly directed side, a member floatingly mounted within said casing and free for movement in a plane at right angles to the axis of said side, the outer periphery of said member being radially inwardly spaced from the inner side of said casing when said member and said side are coaxial to provide a circular unobstructed passageway, means for directing fluid under pressure along the length of said passageway for revolving said member about said axis, and means for connecting said member to a driven element for imparting rotary movement to the latter said last mentioned means comprising an axially extending element on said member adapted to interconnect said member and said driven element.

11. A fluid driven motor comprising: a fixed casing having a substantially circular radially inwardly directed side and a pair of parallel opposed faceplates secured to said side, a member received within said casing and formed with its opposite sides parallel to and closely adjacent the inner sides of said faceplates for floatingly mounting said members relative to said casing for movement in a plane perpendicular to the axis of said casing, means for directing fluid under pressure tangentially between said member and said circular side of the casing and between said opposite sides of said member and said faceplates for imparting a revolvable movement to said member and for so floatingly mounting said member, and means for connecting said member to a driven element for imparting rotary movement to the latter.

12. A fluid driven mechanism comprising an outer member having a substantially circular radially inwardly directed inner side, an inner member floatingly mounted within said outer member and free for movement in a plane at right angles to the axis of said inner circular side, the outer periphery of said inner member being circular and spaced radially inwardly from said inner side of said outer member when said inner and outer members are coaxial to provide a circular unobstructed passageway, means for directing fluid under pressure along the length of said passageway for revolvably moving one of said members relative to the other, said outer member including a pair of opposed end plates connected with said inner side and said inner member being formed with a pair of opposite parallel sides at right angles to its circular periphery, the distance between said opposite sides being less than the spacing between end plates to provide clearance therebetween to permit movement of fluid radially inwardly from said circular passageway between said inner member and one of said endplates.

References Cited in the file of this patent

UNITED STATES PATENTS

| | | |
|---|---|---|
| 483,394 | Seelye | Sept. 27, 1892 |
| 694,101 | Hyde | Feb. 25, 1902 |
| 1,082,285 | Peterson | Dec. 23, 1913 |
| 1,579,146 | Richardson | Mar. 30, 1926 |
| 2,496,291 | High | Feb. 7, 1950 |
| 2,559,620 | High | July 10, 1951 |
| 2,675,777 | Lachaise | Apr. 20, 1954 |
| 2,778,612 | Peterson | Jan. 22, 1957 |

FOREIGN PATENTS

| | | |
|---|---|---|
| 73,769 | Netherlands | Dec. 15, 1953 |
| 252,424 | Great Britain | May 28, 1926 |
| 1,055,503 | France | Oct. 14, 1953 |
| 1,112,427 | France | Nov. 16, 1955 |